Nov. 5, 1968
P. C. BROWN
3,409,090
CONVERTIBLE POWER TOOL APPARATUS
Filed Dec. 28, 1966
5 Sheets-Sheet 1
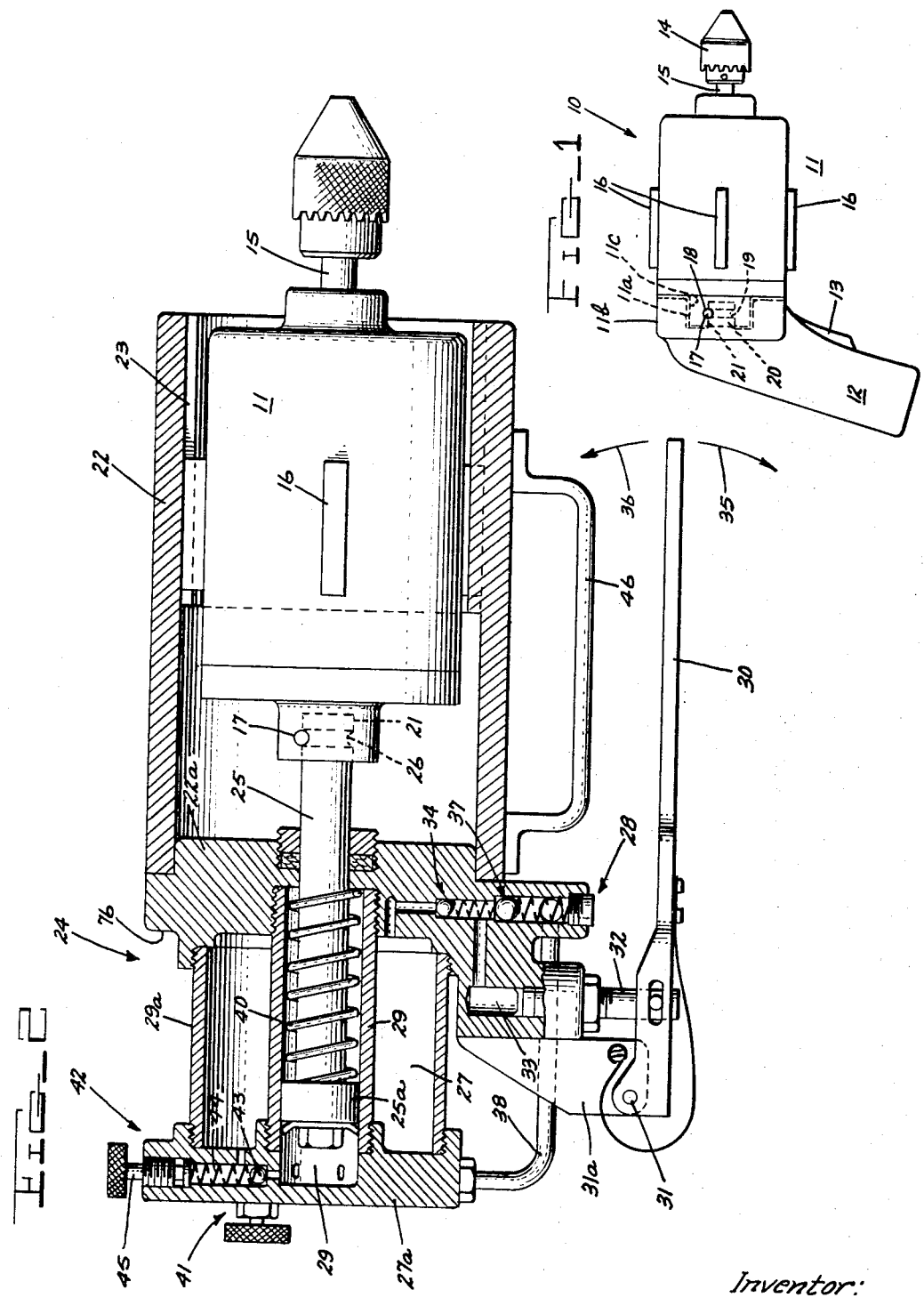
Inventor:
Paul C. Brown,
by Hood, Gust & Irish
Attorneys.

Nov. 5, 1968 P. C. BROWN 3,409,090
CONVERTIBLE POWER TOOL APPARATUS
Filed Dec. 28, 1966 5 Sheets-Sheet 2

Inventor:
Paul C. Brown,
by Hood, Just & Oish
Attorneys.

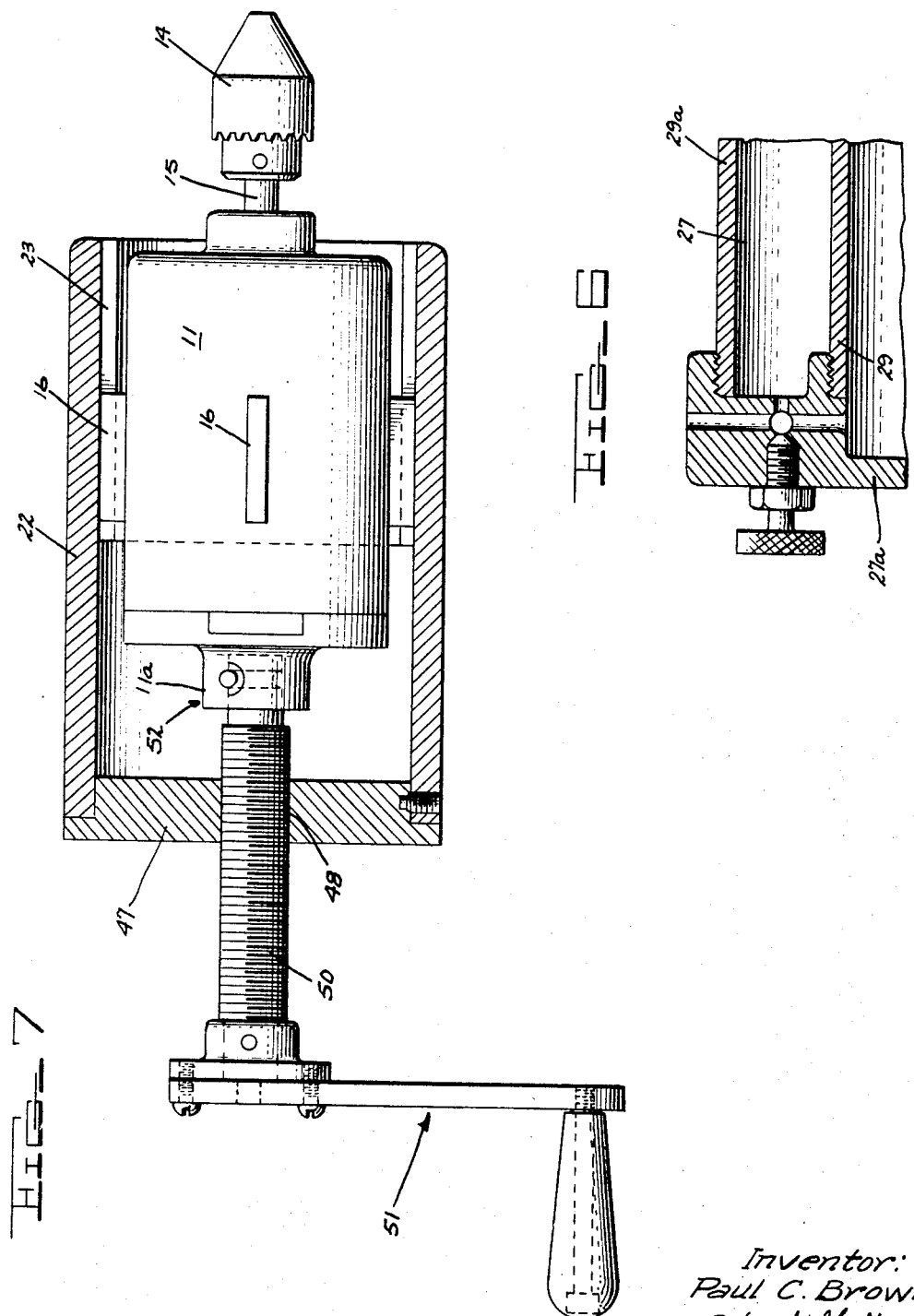

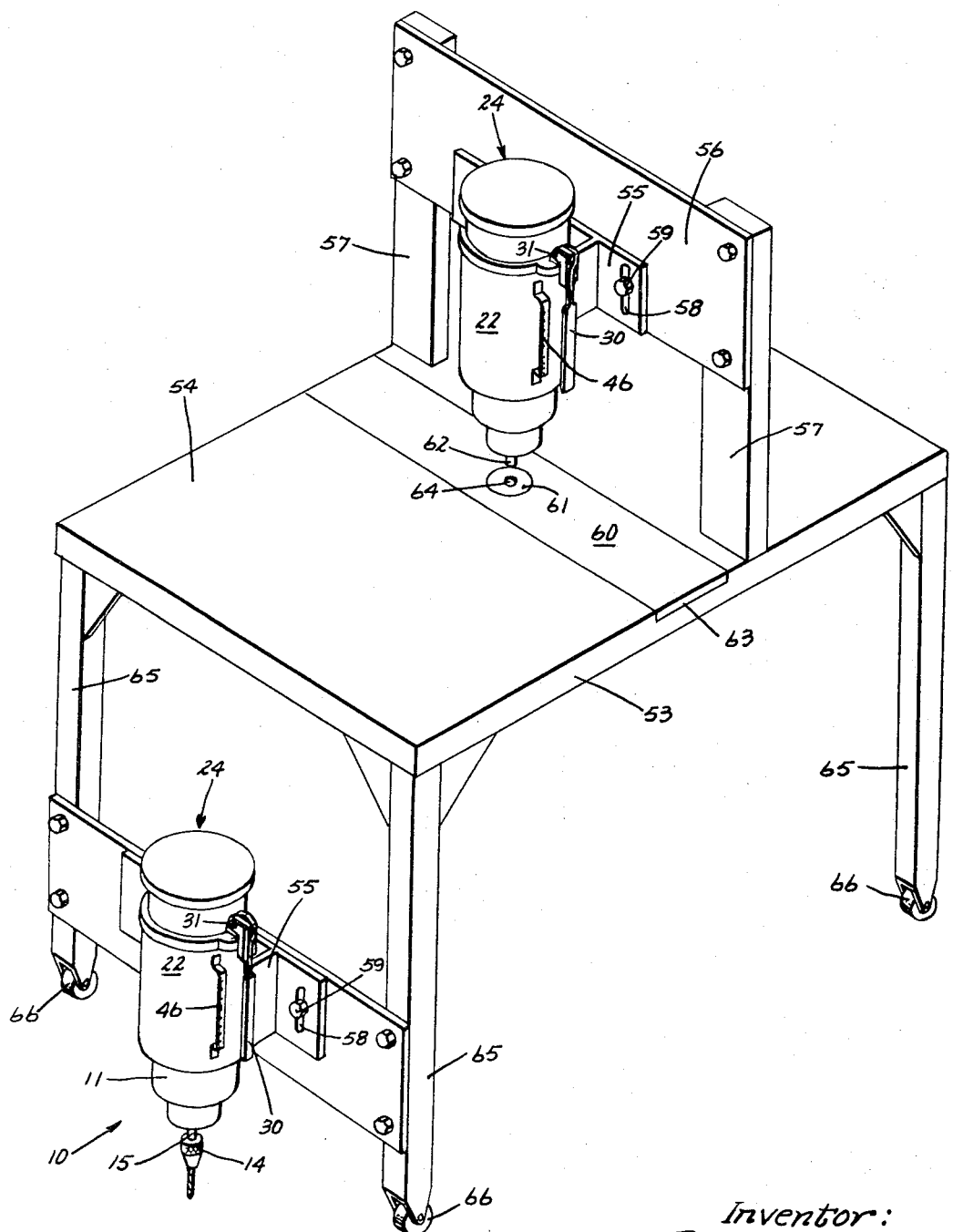

Nov. 5, 1968
P. C. BROWN
3,409,090
CONVERTIBLE POWER TOOL APPARATUS
Filed Dec. 28, 1966
5 Sheets-Sheet 5
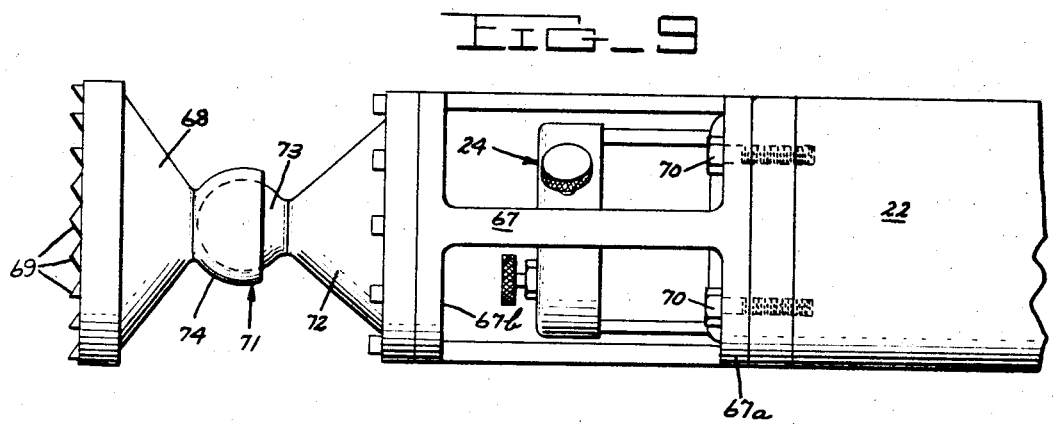
FIG_9
INVENTOR.
Paul C. Brown,
BY Hood, Gust & Irish
Attorneys.

United States Patent Office 3,409,090
Patented Nov. 5, 1968

3,409,090
CONVERTIBLE POWER TOOL APPARATUS
Paul C. Brown, R.R. 2, Waterloo, Ind. 46793
Filed Dec. 28, 1966, Ser. No. 605,447
11 Claims. (Cl. 173—29)

ABSTRACT OF THE DISCLOSURE

The present invention comprises a cylindrically-shaped housing having a tool arranged for axial reciprocation therein. A means is provided for reciprocating the tool in the cylinder, thereby urging the tool toward a work engaging position. The cylinder is either abutted against or supported by a stationary element against which the force required for urging the tool into the work is applied.

The present invention relates generally to a convertible power tool apparatus, and more particularly to the provision of apparatus composed of multiple components which may be interchanged with facility to obtain different power tool devices.

Electric hand drills and manually-driven punches are widely used either to drill or punch holes in materials. In many circumstances, holes are to be formed in heavy gauge steel or other materials, such as concrete, which are not easily penetrated. If ordinary hand drills are used, the operator of the hand drill is often subjected to fatiguing work in positioning and urging the drill toward the material being penetrated.

The present invention provides a supporting and feeding apparatus for a tool, such as an electric drill, said apparatus being held in a stationary frame or being abutted against or held by some kind of a stationary backing element so that the force exerted on the tool is not provided by the operator.

It is an object of the present invention, therefore, to provide an apparatus for supporting and urging a tool toward work, said apparatus being arranged so that the force required for urging the tool into cutting engagement with the work is exerted against a stationary element or frame.

Another object of the present invention is to provide such an apparatus including a hydraulic jack operatively arranged to urge the tool into cutting engagement with the work.

A further object of the present invention is to provide such an apparatus including a jack-screw arrangement for urging the tool into cutting engagement with the work.

Still another object of the present invention is to provide such an apparatus which is swivelly supported on a pedestal against which the force required for urging the tool into cutting engagement with the work is applied.

A still further object of the present invention is to provide such an apparatus wherein the tool may be an electric drill or a punch.

Another object of the present invention is to provide such an apparatus including means for mounting said apparatus on a table and using it as a punch press.

Another object is to provide for convenient interchangeability of the various components mentioned in the preceding objects.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side view of an embodiment of this invention which includes an electric drill showing a hand-grip releasably connected to said drill;

FIG. 2 is a sectional view of another embodiment showing the electric drill of FIG. 1 received in a cylinder having a hand-operated hydraulic jack for reciprocating said drill in said cylinder;

FIG. 6 is a fragmentary sectional view showing a pressure release valve arrangement for the hydraulic jack;

FIG. 7 is a sectional side view of a different embodiment showing the electric drill reciprocably disposed in the cylinder and a jack-screw arrangement for reciprocating said electric drill in said cylinder;

Figure 3:
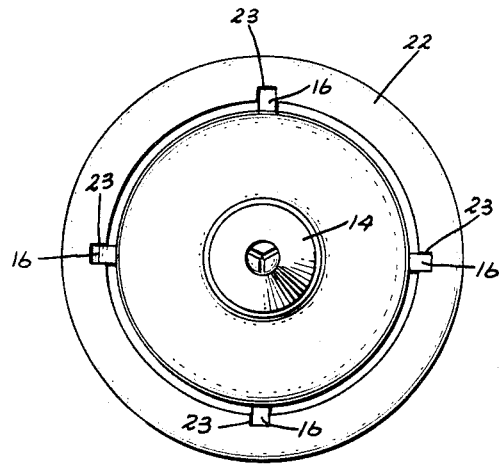
FIG. 3 is an end view of the electric drill and the aforementioned cylinder taken from the right-hand end of FIG. 2.
Figure 4:
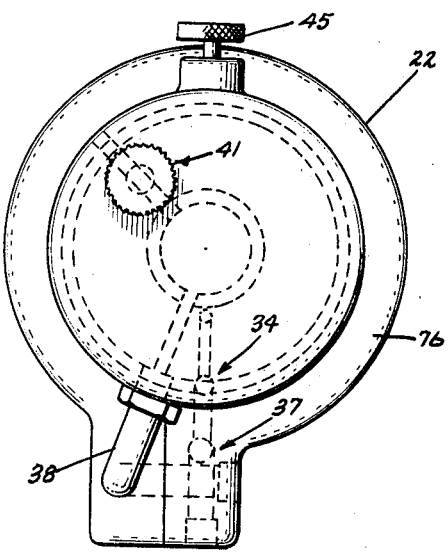
FIG. 4 is an end view of the aforementioned hydraulic jack taken from the left-hand end of FIG. 2.
Figure 5:
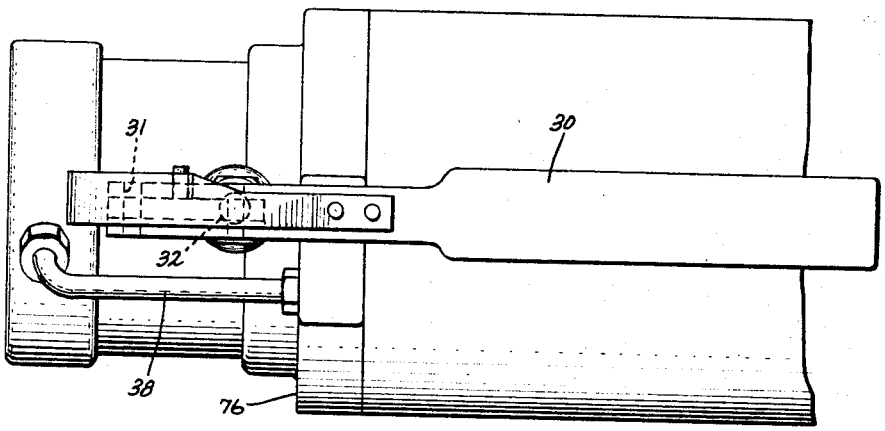
FIG. 5 is a fragmentary side view of the hydraulic jack and cylinder taken from the bottom of FIG. 2.

FIG. 8 is a perspective view showing the apparatus of the present invention being used in two different ways, the first as a punch press mounted on the top surface of a table and the second as a drill mounted on the legs of said table for drilling holes in a floor; and FIG. 9 is a fragmentary side view of still another embodiment showing the cylinder and hydraulic jack with a frame member attached thereto, said frame member being swivelly mounted on a pedestal.

Generally speaking, the present invention relates to an apparatus for urging a tool toward a work-piece and comprises a cylinder having axially extending guideways spaced about its inner wall and an open end for receiving said tool. The tool has one end adapted to receive a punch, drill or the like and its opposite end formed with an axially extending bore opening toward said opposite end and a transaxially extending bore intersecting said axial bore. In the present invention, the tool is arranged for axial reciprocation in and out of the open end of the cylinder and is guided in said reciprocation by a plurality of guides on the exterior wall of said tool arranged to cooperate with the guideways in the cylinder. A plunger is arranged for axial reciprocation in the cylinder. One end of the plunger is proportioned and arranged to be received in the axial bore in the tool, said one end of said plunger having a groove formed about its periphery. A pin, which is reciprocably received in the transaxial bore in said tool is arranged to fit in the groove formed in the end of the plunger, thereby releasably connecting the plunger to the tool. Finally, a means is provided for reciprocating the plunger in the cylinder, thereby reciprocating said tool.

Referring now to the drawings, illustrative structures of the present invention can be visualized in conjunction with the following description.

In FIG. 1, there is illustrated an electric drill, generally cylindrical in shape and indicated generally by the reference number 10, of the type having a housing 11 supported on a hand-grip 12 which has the usual switch 13 for energizing a motor (not shown) mounted inside the housing 11. A chuck 14, of a well-known type, is mounted on the output shaft 15 of the motor. A plurality of axially extending, elongated, bar-like guides 16 are fixedly secured to and circumferentially spaced about the exterior wall of the housing 11. The function of the guides 16, which extend parallel to the longitudinal axis of the drill 10, becomes apparent as this description proceeds. In a preferred embodiment of the present invention, the guides 16 are rectangular in cross-section and are integrally formed on the housing 11.

The hand-grip 12 is releasably connected to the left-hand end of drill 10 by means of an attachment device as follows. On the left end (as viewed in FIG. 1) of the housing 11 is a coaxially arranged cylindrical boss 11a having a coaxially arranged cylindrical bore 21 therein.

The hand-grip 12 has a mounting head 11b provided with a socket portion 11c which slidably receives the boss 11a and rod portion 20 which similarly fits into the socket or bore 21.

The rod portion 20 further is provided with a peripheral recess or groove 19 which registers with a transaxially extending bore 18 in the boss 11a. A pin 17 snugly received by the bore 18 fits into and engages one arcuate portion of the groove 19, thereby securing the hand-grip 12 to the housing 11. As is clearly shown in FIG. 1, the radii of the pin 17, the bore 18 and the groove 19 are substantially equal, the end of the boss 11a engages the bottom of the socket 11c, and the facing portions of the head 11b and the housing 11 engage each other, thereby firmly mounting the hand-grip 12 on the housing 11.

In the present invention, the electric drill 10, shown in FIG. 1, is illustrative only, such that, within the scope of the present invention, other tools such as a punch may be used as will become apparent from the description that follows.

Referring now to FIGS. 2, 3, 4, 5 and 6, a further embodiment of the present invention will be discussed. With the hand-grip 12 removed, the electric drill 10 can be disposed for axial reciprocation in a frame-like carrier or cvylinder 22 as shown in FIGS. 2 and 3. The carrier or cylinder 22 is provided with a plurality of elongated, axially extending grooves or guideways 23 which receive slidably the guides 16 formed on the external wall of the housing 11 of the drill 10. Thus, the drill 10 is guided for axial reciprocation, but is prevented from rotating with respect to the cylinder 22.

A hydraulic jack, indicated generally by the reference number 24, having an axially reciprocable plunger 25 provided with a larger diameter piston head 25a is mounted on the rear end of the cylinder 22. The forwardmost end of the plunger 25 is proportioned and arranged to be received in the bore 21 of the housing 11 and is held in said bore by the pin 17 which fits into a groove 26, like groove 19 (FIG. 1), in the end of the plunger 25. It can be seen, therefore, that the plunger 25 is connected to the housing 11 in the same manner as the hand-grip 12 of FIG. 1. Surrounding plunger 25 is a helical compression spring 40 bearing at one end against piston-head 25 and its other end against end plate 22a on cylinder 22.

In the preferred form of the present invention, the axes of the plunger 25, output shaft 15 of the drill 10 and the cylinder 22 are coincident.

The hydraulic jack 24 comprises a sealed reservoir 27 which contains an appropriate hydraulic fluid and a pump means, indicated generally by reference number 28, for forcing the fluid out of the reservoir 27 and into a tubular member or cylinder 29 in which the piston head 25a and plunger 25 are reciprocably disposed.

The pump means 28 comprises a lever 30 pivotally mounted at 31 on a bracket 31a secured to cylinder 22. The lever 30 is operatively connected to a piston 32 which is reciprocably received in a cylinder 33 formed in a part secured fixedly to cylinder 22. This cylinder 33 is in communication wtih the reservoir 27 through a one-way valve, indicated generally by reference number 34. When the lever 30 is pivoted in the direction of arrow 35, the piston 32 retracts to draw fluid through the one-way valve 34 from reservoir 27 and into cylinder 33. When lever 30 is pivoted in the direction of the arrow 36, the piston 32 is protracted into the cylinder 33, thereby forcing the fluid through a one-way valve, indicated generally by reference number 37, and a tube 38 into the cylinder 29. The one-way valves 34 and 37 are spring-biased closed and otherwise are of a well-known type and need not be elaborated further.

As the fluid is forced into the cylinder 29 against the piston-head 25a, the plunger 25 is urged in the direction of the arrow 39 in opposition to the compression spring 40. Thus, when the fluid is permitted to leave the cylinder 29 and flow back into the reservoir 27, the spring 40 will move the plunger 25 in a direction opposite to the arrow 39. A hand-operated valve, indicated generally by the reference number 41, is provided for permitting flow of fluid from the cylinder 29 into the reservoir 27.

As shown in FIG. 2, the reservoir 27 is formed between cylinder plate 22a, tubular member 29, a second tubular member 29a secured at one end to plate 22a, and an end cap 27a which is secured to the left-hand ends of tubular members 29 and 29a.

In the prefered form of the present invention, a pressure relief valve, indicated generally by reference number 42, is provided for determining the maximum force which is to be exerted on the drill 10 by plunger 25. In FIG. 2, it can be seen that the pressure relief valve 42 is a typical one-way valve 43 which is urged against the direction of fluid flow by a spring 44. A screw 45 is provided for adjusting the compressed length of the spring 44, thereby determining the pressure level which will open the valve 43 and permit fluid flow from cylinder 29 into the reservoir 27.

In FIG. 2, it can be seen that the lever 30 extends back alongside and adjacent to a handle 46 rigidly mounted on cylinder 22. Thus, an operator can pivot the lever 30 with the same hand that he uses to grip the handle 46. Such an arrangement will permit the operator to use his other (free) hand to position the cylinder 22 and the jack 24.

Referring now to FIG. 7, an embodiment of the present invention which utilizes a jack-screw arrangement for reciprocating the drill 10 in the cylinder 22 will be discussed.

A circular end-plate 47 having a threaded center hole 48 is mounted on the rear end of the cylinder 22 as shown and is connected to cylinder 22 by means of set screws 49, only one of which is shown. A threaded plunger 50 having one of its ends proportioned and arranged to be connected to the boss 11a previously described is threadedly received in the center hole 48. A crank, indicated generally by the reference number 51, is operatively connected to the plunger 50 and arranged to rotate said plunger with respect to the end plate 47, thereby reciprocating said plunger and the drill 10 in the cylinder 22. The connection between plunger 50 and housing 11, indicated generally by reference number 52, is identical to the connection between rod portion 20 of the hand-grip 12 and the housing 11 previously described.

From the discussion thus far, it can be seen that the hydraulic jack 24 and the jack-screw arrangement of FIG. 7 are illustrative means for reciprocating the electric drill 10 in the cylinder 22.

If a punch is substituted for the electric drill 10 in the cylinder 22, the apparatus of the present invention may be utilized as a punch press as clearly shown in FIG. 8. In FIG. 8, cylinder 22 is mounted above a table 53 so as to have its axis perpendicular to the top surface 54 of said table. Specifically, cylinder 22 is rigidly mounted on a frame member 55 which is, in turn, vertically adjustably mounted on a flat plate 56 secured to supports 57 which extend vertically upwardly from the top surface 54 of table 53. The supports 57 have flat faces, against which plate 56 is mounted. The support members 57 are rigidly connected to table 53 as by, for instance, welding or other suitable techniques. The frame member 55 is provided with a pair of vertically elongated slots 58, only one of which is shown, which receive mounting studs 59, only one of which is shown, which fasten frame member 55 to the plate 56. Thus, the cylinder 22 is vertically adjustable in the direction of the elongated slots 58. A die plate 60 having a die button 61 for receiving a punch 62 which is reciprocably received in the cylinder 22 is positioned in track 63 formed in the top surface of table 53. It is to be understood, of course, that die plate 60 must be positioned with respect to the cylinder 22 so that the punch 62 is exactly aligned with the internal diameter 64 of the die button 61. Of course, the punch 62 is connected to the plunger 25 in the same manner that the housing 11 is connected to said plunger.

The illustrative embodiment of FIG. 8 provides a mobile punch press which may be set up and utilized on jobs away from an established machine shop. The illustrated table 53 is supported on legs 65 which may or may not be provided with casters 66.

In many construction jobs, it is necessary to drill a plurality of holes in a floor which is rather difficult to drill with an ordinary hand drill. Accordingly, as shown in FIG. 8, the frame members 55 and 56 may be mounted between a pair of the legs 65 so as to position the axis of cylinder 22 vertically with respect to the floor upon which table 53 is supported. Thus, when electric drill 10 is reciprocably disposed in cylinder 22, operation of lever 30 of hydraulic jack 24 will force the drill toward the floor. It may be preferable to remove the casters 66 in order to provide a more stable drilling platform.

In many circumstances, the work is so arranged that holes must be drilled up into the work from a position which is very awkward and fatiguing for the operator. For example, when it is desired to drill a hole in the frame of an automobile, the operator of the drill must slide under the automobile and then lift and support the drill into working position and then urge it into cutting engagement with the frame. The embodiment of the present invention, which is illustrated in FIG. 9, has been provided as a solution for this problem.

In the embodiment of FIG. 9, the cylinder 22 containing electric drill 10 and hydraulic jack 24 are supported on a frame 67 which is rigidly attached to the left end of the cylinder 22 so as to extend axially outwardly from the rear end of said cylinder. This frame 67 is constructed like a cage and encloses the mechanism of the jack 24 as shown. The frame 67 is swivelly supported on a pedestal 68 which is provided with a plurality of cleats 69 disposed on its base. In the illustrative embodiment of FIG. 9, the frame 67, which is cylindrically-shaped and of substantially the same diameter as the cylinder 22, is rigidly fastened to the cylinder 22 by means of screws 70 which extend through clearance holes in the part-circular end section 67a on frame 67. This end section 67a abuts against the flat annular shoulder 76 of the end plate 22a, the screws 70 entering the latter. The end section 67a has cut-away portions which receive the protruding parts of jack 24 carrying bracket 31a, the cylinder 33 mechanism and valve 45 thereby permitting end section 67a to abut against shoulder 76. The frame 67 is provided with cut-outs 67b which permit access to the various valves of the hydraulic jack 24 and the protrusion of the lever 30 mechanism.

The swivel connection between the frame 67 and pedestal 68 is a ball joint, indicated generally by reference number 71, comprising a member 72 having a ball-shaped protrusion 73 and a spherically concave section 74 on the pedestal 68. The member 72 is rigidly fastened to the frame 67 by means of screws 75.

The swivel connection between the frame 67 and pedestal 68 is provided because, in some cases, it may be impossible to drill vertically upwardly into the work. Thus, the pedestal 68 can be placed on a floor and held in position by its cleats digging into the floor, and the frame 67 and cylinder 22 can then be swivelled about the ball joint 71 until the drill 10 contained in the cylinder 22 is aligned with the work.

Recapitulating, the structure of this invention is conveniently convertible between the forms of FIGS. 1, 2, 7, 8 and 9 for achieving different power tools; the form of FIG. 1 being a hand-operated drill, for example; the form of FIG. 8 being a bench-type drill press; and the form of FIG. 9 being a portable drill press. The remaining figures are illustrative of different mechanisms which may be conveniently adapted to the basic components such as the drill 10 and cylinder 22. The disconnect assembly using the structure of the boss 11a, the rod-like element 20, the groove 19 and pin 18 (FIG. 1) contribute materially to this versatility as does the particular cylinder 22 and housing 11 structure.

While there have been described above the principles of this invention in connection with specific apparatus, it is to be clearly understood that this description is made only by way of example and not as a limitation to the scope of the invention.

What is claimed is:

1. Convertible power-tool apparatus comprising tool means for performing a work operation on a workpiece, said means having opposite ends, an attachment device fixedly secured to one end of said tool means for movement therewith; said attachment device including a member having a socket provided with opposite ends, one of said socket ends opening through said member, said socket having an axis extending between said socket ends, said member having a bore intersecting said socket at an angle transverse to said axis, a force-transmitting element having a rod portion removably and snugly fitted into said socket, said rod portion having a recess in the outer surface thereof in alignment and registry with said bore, said bore and said recess removably receiving a pin, said pin engaging said recess for locking said rod portion in said socket, whereby said element is moved with said tool means.

2. The apparatus of claim 1 in which said socket is of uniform size from one of said socket ends to the other, said rod portion being of the same cross-sectional shape as said socket, said bore being straight and intersecting said socket at one side thereof and said recess being in the form of a circumscribing groove in the periphery of said rod portion.

3. The apparatus of claim 2 in which said socket is cylindrical in shape and said rod portion is also cylindrical, said groove defining a plane perpendicular to the socket axis whereby said pin will engage said groove regardless of the rotated position of said rod portion in said socket.

4. The apparatus of claim 3 in which said tool means includes a housing, said member being mounted on said housing and projecting therebeyond in the form of a boss, said boss having an outer surface portion, said force-transmitting element being a hand-grip and having a recess which snugly and slidably engages the outer surface portion of said boss when said rod portion fits into said socket, both said one housing end and said force-transmitting element having engaged abutment surfaces extending radially outwardly from said boss thereby providing additional connection between said element and said housing for transmitting forces therebetween.

5. The apparatus of claim 3 including a hollow frame-like carrier which receives said tool means for reciprocation; said carrier enclosing said tool means, said tool means including a housing, said member being mounted on said housing and projecting therebeyond, guide means connecting said housing and said carrier together for relative reciprocal movement only, and means on said carrier for moving forcefully said force-transmitting element in a direction to move said tool means within said carrier.

6. The apparatus of claim 5 including a supporting frame connected rigidly to said carrier and at least partially enclosing said force-moving means, and a surface-engaging device on said supporting frame for holding said carrier against movement in a direction opposite to the moving force applied to said tool means.

7. The apparatus of claim 5 wherein said carrier is tubular, said guide means including axially extending guideways spaced about the inner wall of said carrier, said carrier having an open end for receiving said tool means, said guide means further including a plurality of guides spaced about the exterior wall of said housing and arranged to enter slidably said guideways, said force-transmitting element having a movable member with one end carrying said rod portion, said movable member forming a part of said force-moving means.

8. An apparatus as in claim 7 wherein said movable member is threaded, and wherein said force-moving means comprises a plate member closing an end of said carrier, said plate member having a threaded hole therein, said movable member being threadedly received in said hole, and hand-crank means for rotating said movable member, thereby reciprocating said tool means in said carrier.

9. An apparatus as in claim 7 wherein said force-moving means includes a fluid power cylinder coaxially mounted on said carrier, said movable member being reciprocably received by said cylinder, and hand operated, fluid-pumping means connected to said cylinder and arranged to urge forcefully said movable member out of said cylinder and toward said carrier, thereby urging said tool means toward said workpiece.

10. An apparatus as in claim 9 including a handle rigidly mounted on the exterior of said carrier and wherein said hand-operated, fluid pumping means comprises a lever having one end operatively pivotally connected to said carrier and its other end disposed adjacent to and in parallelism with said handle, said lever being arranged for pivotal motion toward and away from said handle, and a pump operatively mounted on said carrier for forcing fluid into said cylinder, and means connecting said pump to said lever for operating said pump in response to the aforesaid pivotal motion of said lever.

11. The apparatus of claim 10 wherein said tool means is an electric drill and including a supporting frame rigidly attached to said carrier and at least partially enclosing and extending beyond said force-moving means, and a pedestal member swivelly connected to an end portion of said supporting frame remote from said carrier whereby the reaction force of said tool means in operation can be imparted to a stationary object.

References Cited
UNITED STATES PATENTS

| | | |
|---|---|---|
| 998,210 | 7/1911 | Slentz. |
| 1,539,069 | 5/1925 | Brockett _____ 173—29 X |
| 2,396,007 | 3/1946 | Happe et al. _____ 173—170 |
| 2,643,088 | 6/1953 | Hornack. |
| 2,720,125 | 10/1955 | Palik _____ 77—7 |
| 2,737,065 | 3/1956 | Piersall _____ 77—7 |
| 2,888,965 | 6/1959 | Phillips _____ 77—7 X |
| 2,917,953 | 12/1959 | Badali _____ 77—7 |

DAVID H. BROWN, *Primary Examiner.*